US005776371A

United States Patent [19]

Parker

[11] Patent Number: 5,776,371

[45] Date of Patent: Jul. 7, 1998

[54] CONDUCTIVE COMPOSITION FOR FUSE STATE INDICATOR

[75] Inventor: Robert Parker, Palm Desert, Calif.

[73] Assignee: Avery Dennison Corporation, Pasadena, Calif.

[21] Appl. No.: 632,902

[22] Filed: Apr. 16, 1996

[51] Int. Cl.[6] .............................. H01B 1/22; H01B 1/24; C08L 91/06

[52] U.S. Cl. .............................. 252/502; 252/510; 252/511; 252/512; 252/514; 106/272; 524/277

[58] Field of Search .............................. 252/502, 510, 252/511, 512, 513, 514; 106/230, 272; 524/277

[56] References Cited

U.S. PATENT DOCUMENTS

| | | | |
|---|---|---|---|
| 3,957,694 | 5/1976 | Bolon et al. | 252/514 |
| 4,909,960 | 3/1990 | Watanabe et al. | 252/511 |
| 4,922,242 | 5/1990 | Parker | 340/786 |
| 5,143,649 | 9/1992 | Blackledge et al. | 252/511 |
| 5,547,609 | 8/1996 | Fujii et al. | 252/511 |
| 5,556,576 | 9/1996 | Kim et al. | 252/511 |

*Primary Examiner*—Mark Kopec

*Attorney, Agent, or Firm*—Renner, Otto, Boisselle & Sklar

[57] ABSTRACT

A device for indicating the conducting state of a fuse includes a heat generating material for generating heat in response to an electrical input and adapted to be coupled electrically in parallel with a fuse, and a temperature responsive material thermally coupled to the heat generating material for providing a visually discernable response if heated above a threshold temperature by the heat generating material.

15 Claims, 1 Drawing Sheet

CONDUCTIVE COMPOSITION FOR FUSE STATE INDICATOR

FIELD OF THE INVENTION

This invention relates generally to a device for indicating certain current conditions in an electrical circuit or component, and, more particularly, to device for indicating whether or not an electrical fuse has become non-conducting or has blown.

BACKGROUND OF THE INVENTION

Fuses of many different types are known for preventing hazardous conditions and protecting electrical components from damage caused by excessive current flow through a circuit or device. Fuses have applications in automobiles, general electronics including computers and telecommunications equipment, high power markets such as in industrial and commercial circuits and electrical distribution networks as well as in many other fields in which current protection is required or desired.

As a result of the purpose and typical construction of a fuse in a circuit or device, it is often difficult readily to determine if the cause of an interruption in electrical power is the result of a blown fuse and, if so, which fuse when an application includes more than a single fuse. Although a few fuses have been proposed which attempt to indicate when the fuse has blown, such fuses have tended to be less than satisfactory, either due to expense, potentially hazardous conditions caused by the indicator or because the devices were difficult to read.

It would be desirable to provide a fuse state indicating device which is inexpensive and easy to read.

SUMMARY OF THE INVENTION

The present invention provides a fuse state indicator which can be coupled to a fuse, and which includes a substrate, a conductive layer electrically in parallel with the fuse for generating heat when the fuse blows, and a temperature responsive layer which undergoes a preferably visually discernable change when heated above a certain temperature by the heat generating layer. The fuse state indicator may be reversible or irreversible depending on the application and can be affixed to the inside or outside of the fuse body during manufacture of the fuse or can be affixed to the fuse as a label after manufacture. The conductive layer may include a composition including a conductive material and a non-conductive, meltable material dispersed with the conductive material which substantially and irreversibly increases the resistance of the conductive layer when the meltable material is heated above its melting point. The conductive layer may have application not only in a fuse state indicator but also in many other areas of electronics where it can function as a thermal fuse or as part of remote sensing device, for example.

In accordance with one aspect of the invention, a device for indicating the conducting state of a fuse includes a heat generating material for generating heat in response to an electrical input and adapted to be coupled electrically in parallel with a fuse, and a temperature responsive material thermally coupled to the heat generating material for providing a visually discernable response if heated above a threshold temperature by the heat generating material.

In accordance with another aspect of the invention, a composition includes a binder, an electrically conductive material and discrete volumes of electrically non-conductive meltable material dispersed in the conductive material.

In accordance with another aspect of the invention, a product is prepared by the process including the steps of mixing a binder, an electrically conductive material and discrete volumes of electrically non-conductive meltable material at a temperature below the melting point of the meltable material and drying the mixture.

In accordance with a further aspect of the invention, a fuse includes a fuse element which becomes non-conductive above a threshold current, a heat generating material coupled electrically in parallel with the fuse element for generating heat in response to an electrical input, and a temperature responsive material thermally coupled to the heat generating material for providing a visually discernable response if heated above a threshold temperature by the heat generating material.

In accordance with a still further aspect of the invention, a fuse state indicating label includes a substrate layer, a heat generating layer for generating heat in response to an electrical input and adapted to be coupled electrically in parallel with a fuse, and a temperature responsive layer thermally coupled to the heat generating layer for providing a visually discernable response if heated above a threshold temperature by the heat generating layer.

In general, the invention comprises the foregoing and other features hereinafter fully described and particularly pointed in the claims, the following description and the annexed drawings setting forth in detail a certain illustrated embodiment of the invention, this being indicative, however, of but one of the various ways in which the principles of the invention may be employed.

DETAILED DESCRIPTION OF THE INVENTION

Figure 1:
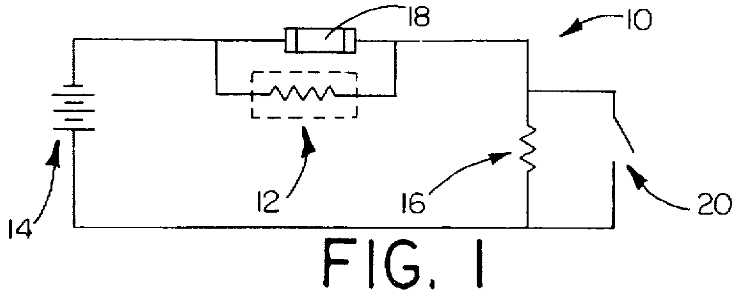
FIG. 1 is a schematic circuit diagram of a fuse and the fuse state indicator of the present invention in an electrical circuit.

With reference to the figures and initially to FIG. 1 there is shown a schematic circuit diagram of an electrical circuit 10 including the fuse state indicator 12 of the present invention. The circuit 10 further includes a voltage source 14, a load 16 and a fuse 18 in series. The fuse indicator 12 is connected electrically in parallel with the fuse 18 to detect and provide a visual indication of the state of the fuse 18. The fuse 18 in turn is sensitive to the amount of current flowing through the circuit 10 and is operable to become electrically open or non-conducting when an excess of current flows through the fuse. Thus, the fuse state indicator 10 provides a visual indication of whether a fuse, such as the fuse 18, has become non-conducting, commonly known as being a "blown" fuse, and whether the fuse has detected an overcurrent condition in the circuit 12.

The fuse indicator 12 preferably has a very high resistance relative to the fuse 18 in a non-blown state, and thus when the fuse is conducting, the majority of current flow is through the fuse. The fuse state indicator 12 is designed so that such minimal current flow through the indicator does not cause it to alter its visual indication.

An overcurrent condition is illustrated in the exemplary circuit 12 when the switch 20 is in a closed state short circuiting the load 16, as may occur in a device due to a defect, wear or for other reasons. Such a short circuit of the load 16 may appreciably increase the current flow through the circuit and through the fuse 18 and fuse state indicator 12. The increased current causes the conducting or fuse element of the fuse to become electrically open or non-conductive. Once the fuse has blown, all of the voltage appears on the fuse state indicator 12, causing the fuse state indicator to change its visual state to indicate that the fuse has blown, herein called the "blown state." Preferably, the resistance of the fuse blown indicator 12, once it has changed visual states to indicate a blown condition, increases significantly to essentially open the circuit 10 and prevent current flow through the circuit. The blown fuse indicator 12 is also preferably irreversible so that once it has changed states to indicate a blown fuse, its visual indication will remain constant so that it can be examined at any time to determine the state of the fuse.

Figure 2:
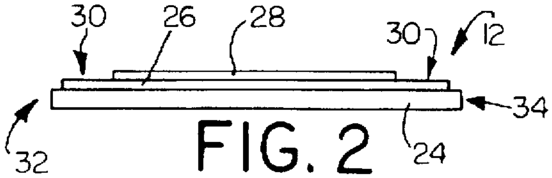
FIG. 2 is an elevation view of the fuse state indicator showing the different layers making up the fuse state indicator.
Figure 3:
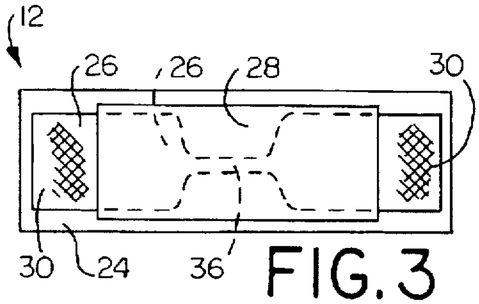
FIG. 3 is a top view of the fuse state indicator.

With reference to FIGS. 2 and 3 there is shown one embodiment of a fuse state indicator 12 including a substrate 24, an electrically conductive layer 26 disposed on the substrate and a thermochromic layer 28 disposed on at least part of the electrically conductive layer. Alternatively the electrically conductive layer 26 and the temperature responsive layer may be disposed on opposite sides of the substrate 24 as discussed below. The substrate 24 may be one of a variety of electrically non-conductive materials including certain papers and plastics which are preferably not flammable or have been treated with a fire retardant product to render them non-flammable. The substrate 24 may include an adhesive to facilitate application to an electrical component or fuse. Alternatively, a surface of an electrical component or fuse or other convenient surface may serve as a substrate to which the electrically conductive layer 26 and thermochromic layer 28 are applied.

The electrically conductive layer 26 may be disposed on the substrate 24 or other surface by printing, coating, or through a similar process. The conductive layer 26 includes areas 30 adapted to allow the distal ends 32, 34 of the conductive layer to be electrically coupled in parallel with the fuse 18. Preferably, the conductive layer 26 narrows to a neck portion 36, thus having greater resistance than other areas of the conductive layer, to promote an adequate heating of the temperature responsive layer 28 in this area to create a visual change in the temperature responsive layer when current flow through the conductive layer exceeds a certain level indicating that the fuse to which the device is coupled has blown. The design, pattern and/or orientation of the conductive layer 26 and particularly of the neck portion 36 can be tailored to produce a desired effect in the temperature responsive layer 28, as will be discussed further below. Further, the color, opacity or translucidity of the conductive layer 26 may be chosen to provide the desired response or contrast when the fuse state indicator 12 is in a blown state.

The conductive layer 26 may be composed of or include a conductive ink such as Acheson Carbon Ink SS423 manufactured by Acheson Colloids alone or in combination with one or more other materials. As noted above, in the case of overcurrent detection in the circuit, it is desired that the fuse state indicator 12 increase substantially in resistance to prevent substantial current flow through the circuit. The increase in resistance may be a result of a breakdown in the substrate 24 or the conductive layer 26 or through a cooperative breakdown between the substrate and the breakdown. Further, the conductive layer may be made of a material that increases substantially in resistance as a function of temperature of the layer, such as a material which exhibits a positive thermal coefficient (PTC) change of resistance over a certain temperature range or at or above a certain threshold temperature.

Materials suitable for use as a conductive layer 26 exhibiting a PTC change of resistance generally include an electrically conductive material and an electrically non-conductive, meltable material dispersed within a binder. For example the conductive layer may include a mixture of conductive ink, such as Acheson Carbon Ink SS423 manufactured by Acheson Colloids, and particulate wax, such as a wax manufactured by Petrolite identified as T850 wax having a particulate size of 3 to 10 microns, preferably 3 to 5 microns, and a melting point of approximately 107 degrees celsius. Such a mixture could be printed or otherwise applied to the substrate 24 or other surface and then dried. Other suitable conductive inks and natural or synthetic wax materials are commercially available. Suitable conductive ink and wax mixtures would yield a resistance value that at an amperage level slightly above the maximum amperage rating of the fuse for which the fuse state indicator is to be used in association with, would cause the conductive layer to be heated above the melting point of the wax.

Preferably, the conductive ink and wax are mixed at a general range of 100 grams of conductive ink to 5 to 40, more preferably 20, grams of wax, and at a temperature below the melting point of the wax. The mixture of conductive ink and particulate wax produces a conductive layer 26 which exhibits an irreversible PTC change of resistance over a broad range of temperatures with the resistance increasing substantially as the temperature of the conductive layer exceeds the melting point of the particulate wax. Accordingly, such a conductive layer 26 would draw very little current from the power supply after the fuse had blown and the wax in the conductive layer had melted. It is also desirable that for applications where the voltage in the circuit is potentially quite high, such as in industrial and heavy commercial applications, that the mixture of conductive ink and wax have a relatively high resistance in an initial state before heating, and that the resistance increase rapidly in the case of a fuse blowing so that the conductive layer will resist sparking.

The temperature responsive layer 28 is disposed over and thermally coupled with the electrically conductive layer 26 while leaving the areas 30 of the electrically conductive layer exposed for connection electrically in parallel with a fuse. The temperature responsive layer 28 preferably undergoes an easily discernible change in optical states as the layer is heated beyond a certain threshold or transition temperature, for example, a change from opaque or translucent to transparent to reveal the conductive layer 26 therebeneath. In some instances the temperature responsive layer 28 may include a thermochromic material which changes from a state where it highly scatters light to appear white to one where it becomes transparent or the temperature responsive layer may include a thermochromic material which changes optical properties from a certain color to transparent. Preferably, the optical change of material chosen for the temperature responsive layer 28 is irreversible so that the visual indication that the fuse has blown is permanent. However, in applications where the fuse state indicator 12 is removable from the fuse and where adequate power will continue to flow through the circuit to maintain the fuse state indicator in its blown state until the indicator can be inspected, the temperature responsive material may be reversible.

In applications where it is desired that the fuse state indicator 12 be irreversible, one suitable material for the temperature responsive layer 28 is particulate wax dispersed in a clear binder. When in an unmelted state, the particles of wax act to scatter light incident on the temperature responsive material very well, thus causing the temperature responsive layer 28 to appear an opaque white. When the temperature responsive layer 28 is heated above its melting point by the conductive layer 26, the wax melts and becomes substantially more light transmissive, thus allowing the conductive layer 26 to become visible through the temperature responsive layer. Such a temperature responsive material 28 can be made by mixing a wax manufactured by Petrolite identified as T850 wax having a particulate size of 3 to 10 microns, preferably 3 to 5 microns, with NAZDAR 8800 clear binder and a thinner material and then the material applied where desired, such as by coating, printing, painting, etc., and dried. The mixture may be in a general range of 5 to 20, preferably 10, parts wax and approximately 10 parts binder to approximately two to three parts thinner by weight, although other suitable ranges can be used depending on the application.

Figure 4:
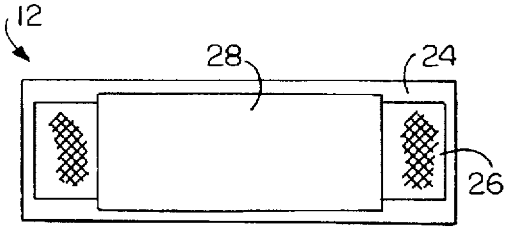
FIG. 4 is a top view of the fuse state indicator in a non-blown state.
Figure 5:
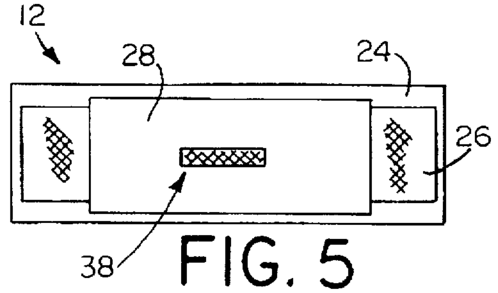
FIG. 5 is a top view of the fuse state indicator indicating the detection of a blown fuse.

A fuse state indicator 12 having a temperature responsive material 28, as described immediately above, that is opaque and highly scattering so as to appear white when below its transition temperature, and which changes to transparent to reveal the, for example, black or colored conductive layer 26 below when heated above its transition temperature is shown in FIGS. 4 and 5. In operation, when the fuse state indicator 12 is placed electrically in parallel with a fuse 18 in a conducting or non-blown state, as shown in the circuit of FIG. 1, the fuse state indicator has a resistance substantially higher than the fuse and thus a very small amount of current, insufficient to cause the conducting layer 26 to heat the temperature responsive layer 28 above its transition state, flows through the fuse state indicator. Since the temperature responsive layer 28 is thus below its transition temperature when the fuse is in a non-blown state, substantially the whole area of the temperature responsive layer appears white, yielding the display as is shown in FIG. 4.

If the current in the circuit 10 exceeds the amperage permitted by the fuse 12, the fuse will blow allowing substantially greater current to flow through the fuse state indicator 12. The conducting layer 26 of the fuse state indicator 12 will thus generate heat elevating the temperature of at least a portion 38 (as seen in FIG. 5) of the temperature responsive layer 28, such as that primarily adjacent the neck portion 36 of the conductive layer, above its transition temperature. The portion 38 of the temperature responsive layer 28 will thus change to a generally transparent state permitting the conductive layer 26 below to be visible, resulting in the display as is seen in FIG. 5. Concurrently, the resistance of the conductive layer 26 will preferably increase dramatically as the wax melts in the conductive layer, thus essentially opening the circuit 10 and preventing substantial current flow therethrough. Leucodyes and other similar acting materials may also be employed in combination with the wax or as a substitute for the wax in the conductive layer 26.

As a result, the fuse state indicator 12 allows the state of the fuse associated therewith to be ascertained readily through a visual indication.

Figure 6:
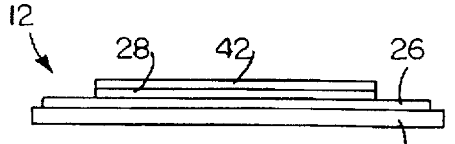
FIG. 6 is an illustration of an alternate embodiment of the fuse state indicator including a protective layer.

In some instances, a protective layer 42 of glass beads and binder material or a similar protective layer may be applied atop the temperature responsive layer 28, as shown in FIG. 6, to aid in preventing or containing sparking in the conductive layer 26 when a fuse associated with the fuse state indicator 12 blows. Such a protective layer 42 may have particular use in a fuse state indicator 12 employed in high voltage and high power applications where sparking would be more likely to occur.

Figure 7:
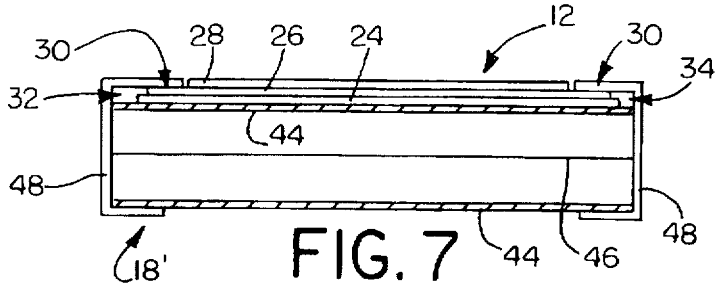
FIG. 7 is an illustration of a fuse and a fuse state indicator manufactured therewith.

An embodiment of the test fuse indicator 12 employed with a cylindrical fuse 18' is shown in FIG. 7. This cylindrical fuse 18' includes a glass or plastic cylinder 44 which houses a fuse element 46 and is encased by electrically conductive end caps 48. The fuse state indicator 12 is positioned adjacent the outside wall of the cylinder 44 with the substrate 24 and the conductive layer 26 extending axially along the cylinder so that the contact areas 30 of the conductive layer are in contact with the conductive end caps 48 when the end caps are crimped in place on the cylinder. In this way, the distal ends 32, 34 of the conductive layer 26 are electrically coupled with the fuse element 46, thus placing the conductive layer 26 electrically in parallel with the fuse element. Alternatively, the conductive layer 26 and the temperature responsive material 28 could be printed directly upon the fuse cylinder 44 with the need for an additional substrate, particularly when the fuse cylinder is constructed of paper or another material with low thermal conductivity.

Figure 8:
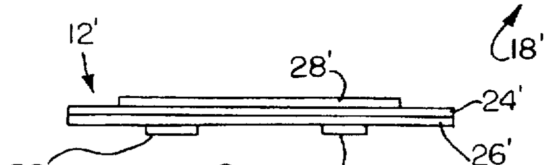
FIG. 8 is a plan view of an alternate embodiment of a fuse state indicator adapted to be attached to a fuse as a label.
Figure 9:
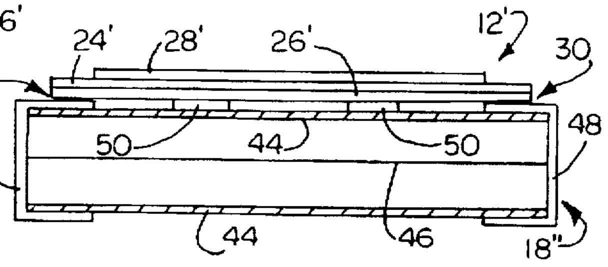
FIG. 9 is an illustration of fuse with the fuse state indicator of FIG. 8 attached as a label thereto.

A further embodiment of the fuse state indicator 12' adapted to be applied to a fuse as a label is shown in FIG. 8. The fuse state indicator 12' includes a substrate 24', a conductive layer 26' and a temperature responsive layer 28' similar to those described above. However, in this embodiment of the fuse state indicator 12', the electrically conductive layer 26' and the temperature responsive layer 28' are disposed on opposite sides of the substrate 24'. The fuse state indicator 12' is shown attached to a fuse in FIG. 9. The fuse state indicator 12' is affixed to the fuse 18" with the contact portions 30' of the conductive layer 26' coupled to the conductive end caps 48 of the fuse. Preferably, an electrically conductive adhesive affixes the electrically conductive layer 26' to the end caps 48 to provide good electrical coupling between the fuse 18 and the fuse state indicator 12'. In such an embodiment the fuse state indicator 12' preferably also includes one or more spacer blocks 50 spacing the conductive layer 26' from the fuse cylinder 44 to thermally isolate the fuse state indicator from the fuse to prevent the fuse cylinder wall from acting as a heat sink and thereby to allow the heat generated by the conductive layer 26' to adequately heat the temperature responsive layer 28' to provide the desired response.

A fuse state indicator in accordance with the invention may also be used in connection with one or more fuses in several other ways. For example, a reversible fuse state indicator can be affixed to a fuse block holding one or more fuses to provide an indication whether a fuse electrically coupled to the fuse block is in a conducting state or has been blown. In a instance when the fuse state indicator 12 is desired to be attached to a fuse block as opposed to a fuse, it is preferable that the fuse state indicator is reversible so that it need not be replaced after a fuse is blown. In such an instance the temperature responsive layer 28 may include a reversible thermochromic material, such as one manufactured by Matsui Chemical Company.

The conductive layer 26 described above including a conductive material, such as carbon or silver dispersed with an electrically non-conductive material, such as wax, within a binder (henceforth referred to as an irreversible PTC material) may also have several other applications outside of a fuse state indicator. For example, the resultant material could also be used as a heat-sealing film in which it could be readily detected whether the film had been heated to the desired peak temperature as a function of the resistance change of the material. To explain, since the material acts as an irreversible PTC material by measuring the resistance of the material after the heat-sealing operation, one could tell whether, based on the resistance of the material, the heat-sealing material had been heated to an adequate temperature to seal a container properly.

The irreversible PTC material could also be used to make an inexpensive printed carbon heater. One problem with some conventional printed heaters is that if one localized area of the heater is insulated more than other areas, that area may become excessively heated, and could damage the device which it is heating or possibly cause a fire hazard. Using the combination of carbon dispersed within a binder with a nonconducting wax material, if the heater became overly hot, the wax in the heater would melt essentially shutting off the device because of the substantial increase in resistance of the device when the wax melts.

In this way, the irreversible PTC material could also function as a thermal fuse. A thermal fuse composed of this material could be mounted on a motor, generator, transformer, etc. to prevent high thermal loading on key components of the motor, etc. by essentially opening the circuit when the component became so hot as to melt the wax in the material and increase its resistance.

The irreversible PTC material could also be used in remote sensing operations. One problem encountered in sterilization operations, for example, is that the contents of a box which has been sterilized, such as through an autoclave operation, cannot be checked since opening the container would contaminate the contents. By printing the irreversible PTC material on the container, whether or not the container was properly sterilized, as measured by the fact that the container was elevated to a certain temperature, can be detected through measuring the resistance of the material after the sterilization operation.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. A composition having a positive temperature coefficient of resistance comprising a binder, an electrically conductive material and discrete volumes of electrically non-conductive meltable material insoluble in the binder and distributed throughout the binder, wherein the binder and the electrically non-conductive meltable material are not the same, and wherein the composition exhibits an irreversible electrical resistance change when the composition reaches a temperature above the melting point of the non-conductive meltable material.

2. The composition of claim 1, wherein the binder and the electrically conductive material comprises an electrically conductive ink.

3. The composition of claim 1, wherein the volumes of electrically non-conductive meltable material is wax.

4. The composition of claim 3, wherein the discrete volumes of wax have sizes of about 3 to 10 microns.

5. The composition of claim 1, wherein the composition comprises about ten parts of conductive material to two parts of non-conductive material by weight.

6. The composition of claim 1, wherein the electrically conductive material comprises carbon.

7. The composition of claim 1, wherein the electrically conductive material comprises silver.

8. A product having a positive temperature coefficient of resistance prepared by the process comprising the steps of mixing a binder, an electrically conductive material and discrete volumes of electrically non-conductive meltable material insoluble in the binder at a temperature below the melting point of the meltable material to distribute the discrete volumes of electrically non-conductive meltable material throughout the binder, wherein the binder and the electrically non-conductive meltable material are not the same and drying the mixture, whereby the resulting product exhibits an irreversible electrical resistance change when the product reaches a temperature above the melting point of the non-conductive meltable material.

9. The product of claim 8, wherein the meltable material comprises wax.

10. The product of claim 9, wherein the wax is synthetic.

11. The product of claim 9, wherein the electrically conductive material and wax are mixed at a ratio of 10 parts material to 2 parts wax by weight.

12. The product of claim 9, wherein the volumes of wax have a size of about 3 to 10 microns.

13. The product of claim 8, wherein the electrically conductive material comprises carbon.

14. The product of claim 8, wherein the electrically conductive material comprises silver.

15. The product of claim 8, wherein the binder and the electrically conductive material are in the form of an electrically conductive ink.

* * * * *